Sept. 28, 1965   W. BOON   3,208,800
PNEUMATIC CONVEYING SYSTEM FOR BULKY MATERIALS
Filed Dec. 5, 1963   2 Sheets-Sheet 1
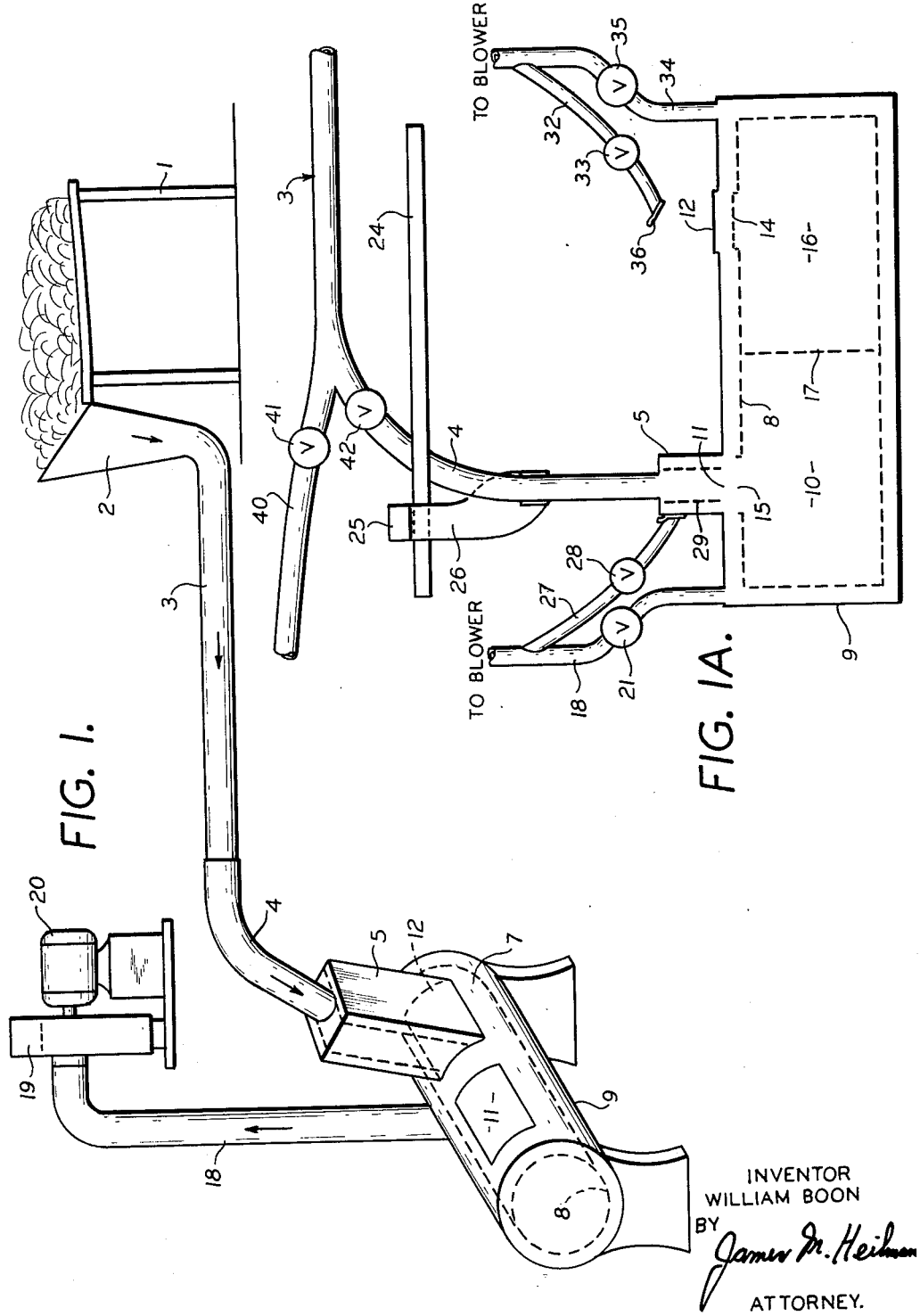
FIG. I.
FIG. IA.
INVENTOR
WILLIAM BOON
BY James M. Heilman
ATTORNEY.

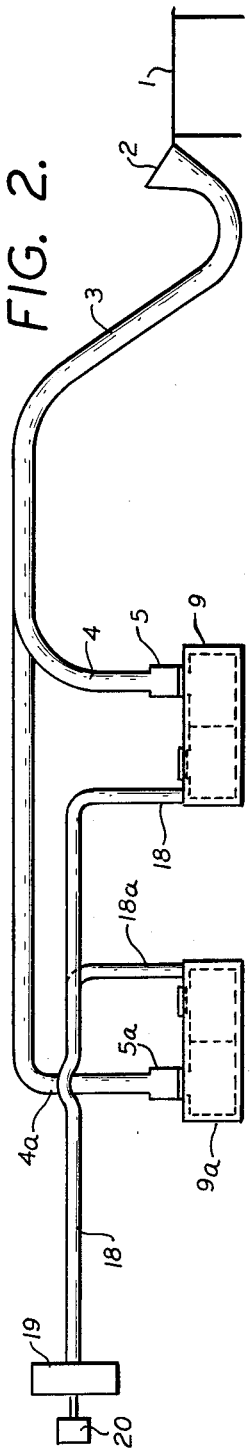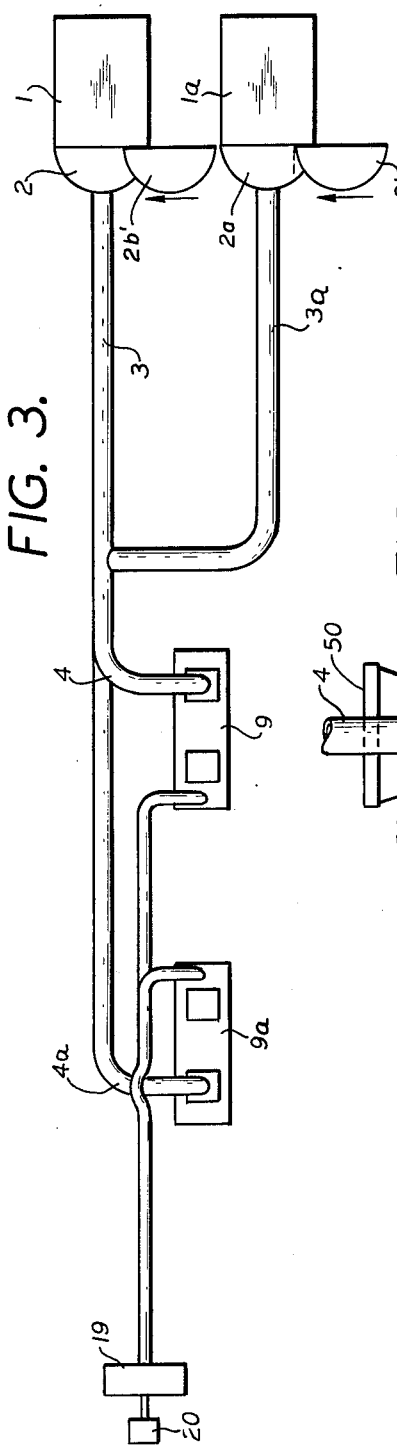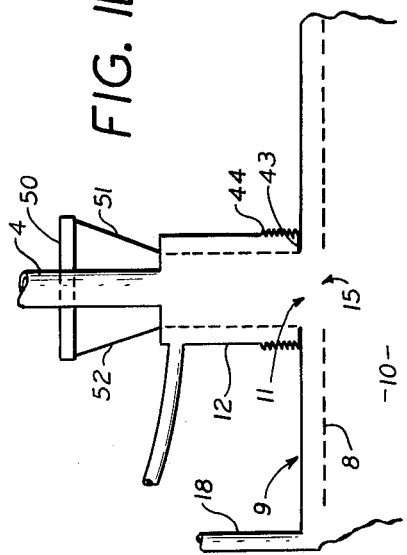

United States Patent Office 3,208,800
Patented Sept. 28, 1965

3,208,800
PNEUMATIC CONVEYING SYSTEM FOR
BULKY MATERIALS
William Boon, The Towers, 215 Passaic Ave.,
Passaic, N.J.
Filed Dec. 5, 1963, Ser. No. 328,368
12 Claims. (Cl. 302—17)

The present invention is broadly concerned with an improved integrated conveying system. The invention is especially concerned with a unique pneumatic system whereby materials are effectively and efficiently transferred from one location to another. The invention is particularly adapted for conveying or transporting bulky materials such as piece goods, yard goods, fabrics, garments, clothing, and the like from one location to another and is especially adapted for the transfer of materials in installations such as commercial laundries, textile plants, chemical plants and the like. In accordance with a preferred adaptation of the present invention, bulky articles such as clothing, laundry and the like are conveyed from a receiving or loading area or areas to a work or process area or areas by pneumatic means, and by employing a unique and effective combination of equipment.

Thus, it is the principal object of the present invention to provide in combination with the receiving stations a simple and effective method and combination of equipment for transferring bulky materials such as laundry, garments and the like to a work area which may comprise process equipment such as washing machines, tumblers, driers and the like. Another object of the present invention is to secure the effective and dependable conveying of bulky articles such as garments, fabrics, clothing and the like from one lateral location to another, which latter delivery point or subsequent work area may be at a higher or lower level than the loading or receiving point. A still further object of the present invention is concerned with an improved pneumatic system which is entirely suitable and very dependable and flexible for conveying all types of material as, for example, damp and weighty laundry materials. The invention is very desirable for use in a single floor processing system. With the foregoing and other objects in view, the invention consists in the improved process and combination of apparatus for conveying materials laterally which may be to a higher or lower level.

The present invention may be readily understood by reference to the drawings diagrammatically illustrating adaptations and embodiments of the same. FIGURE 1 illustrates an integrated system whereby materials such as bulky, dry or damp laundry are conveyed from a loading table or receiving unit into a processing unit as, for example, a washing machine, drying machine, tumbler and the like. FIGURE 1A is a somewhat detailed diagram of a processing unit showing a number of embodiments of the same. FIGURE 1B illustrates a further adaptation of the hood element utilized in the present invention. FIGURE 2 diagramatically illustrates the overall system and combination of equipments or units. FIGURE 3 in essence is a top view of the system illustrated in FIGURE 2.

Referring specifically to FIGURE 1, bulky material to be processed such as incoming laundry is placed on a loading or receiving table or equivalent unit 1. The incoming material may be manually dumped or placed on unit 1, or mechanical means may be provided for delivering the material to this unit. Table 1 preferably comprises a vibrating table which is actuated by suitable and conventional means and/or a constant feed device. By this means, a predetermined and uniform rate of supply of the material, laundry and the like is introduced into the conveying system. Unit or receiving-feeding table 1 may also be adjusted to feed material into the sysstem at predetermined time intervals.

The laundry passes along table 1 and is separated to the desired degree by the vibrations and loaded into intake hopper 2 as described. The laundry, by means hereinafter described, is caused to pass through a conduit or conveying duct 3 and thence preferably through a flexible tube or conduit 4 through a separator hood 5 into a processing machine 7. Processing unit 7 may comprise a drier or a washing machine or any other unit for processing the conveyed articles.

Apparatus or washing machine 7 comprises a perforated cylindrical unit 8, suitably mounted for rotative movement within cylindrical tub 9. The tub has two doors 11 and 12 while the perforated inner unit 8 has two doors 14 and 15 (see FIGURE 1A).

Thus, in operation, material such as laundry and the conveying air stream pass through duct 3, through flexible duct 4, through hood 5, through door 12 of tub 9, and then through door 15 of perforated cylinder 8 into washing zone or compartment 10 within cylinder 8. The conveying pneumatic stream then passes through duct 18, into air suction blower 19, which is driven by means of motor 20.

It is to be noted that tub 9 has two doors 11 and 12 which align with two doors 15 and 14 of the perforated suitably mounted inner cylinder or washing unit. In accordance with a preferred adaptation of the present invention, the separator hood 5 as shown on FIGURE 1 is mounted on a framing structure which will permit hood 5 to be retracted away from the washing machine tub door 12 and move horizontally to the opening of the second tub door 11. In this manner, desirable distribution of the laundry is secured in washing unit 8.

Reference is made to FIGURE 1A which illustrates in some detail the structure of tub 9 and washing unit 8. Similar elements discussed in FIGURE 1 are similarly numbered in FIGURE 1A. As pointed out heretofore, tub 9 contains doors 11 and 12 which align with doors 15 and 14 on washing unit 8. Hood 5 is set over door 11 and door 15 and suitably attached to the casing of tub 9. Doors 12 and 14 are suitably sealed so that the desired suction is secured, permitting flow of laundry and carrying air through conduit 3 and flexible conduit or duct 4. Thus, in accordance with one adaptation of the invention, air and laundry pass into washing zone 10 wherein the laundry is uniformly deposited and wherein the air is withdrawn through duct 18 passing by control valve 21. A second washing zone 16 is secured by means of a perforated transverse element or screen 17. While only two zones are shown; namely, 10 and 16, it is to be understood that the perforated cylinder element 8 may contain any number of zones as, for example, from 2 to 8 and the like. Under these conditions, it is obvious that doors must be provided in tub 9 as well as in the perforated cylindrical element so as to permit the introduction of laundry or other material into the respective washing or processing zones.

As pointed out heretofore, a preferred structure is to provide a rail or similar element 24 which is substantially parallel to the axis of tub 9 and which is positioned overhead so as to permit duct 4 to be supported thereon by means of a trolley 25 and supporting struts or equivalent means 26. Thus, hood 5 can be moved axially along tub 9 as, for example, from tub opening 11 to tub opening 12 by moving trolley 25 along rail 24 which is suitably supported to the building structure.

Another adaptation of the invention is to remove the conveying air stream through duct 27 controlled by valve 28. Thus, the air will be removed through a perforated inner cylinder 29, through valve 28 and duct 27. This will permit the laundry to fall freely into washing or processing zone 10. Under certain circumstances, it may be desirable to withdraw the supporting air through both ducts 18 and 27. 32 is a similar duct as compared to duct 27 and is controlled by valve 33. Duct 34 is similar to duct 18 and is controlled by valve 35. These ducts are used when hood 5 is positioned over tub door 12 and tub door 11 is suitably sealed.

Under certain circumstances, it may also be desirable to utilize two or more hoods positioned over the respective doors on the tub in order to secure the desired distribution of the laundry within the system. A clamp or swivel connection 36 is positioned on duct 32 to permit a rigid coupling of duct 32 to hood 5 when it is desired to use this technique of removing carrying air. An equivalent coupling unit is provided on duct 27.

A further modification is to divide the laundry flowing through duct 3 into two streams for conveying to a second tub or processing unit. Under these conditions, material in conveying air are passed through duct 40 controlled by valve 41 rather than through duct 4 controlled by valve 42.

As pointed out by this technique, the desirable distribution of the laundry or other material within the processing unit is secured.

After the hood is retracted, the cylinder door is closed and thereafter the tub door pulled down and closed to make a complete closure, at which time a button or other control means is pushed which activates the washing machine. The machine comprises a conventional one and rotates about 15 seconds in one direction and then by suitable electrical devices the rotation is reversed for 15 seconds in another direction. As pointed out, the present invention is concerned with a unique conveying or transfer system and therefore for simplicity, the necessary plumbing connections such as hot and cold water connections to the tub or hot air lines, drains and the like are not shown with respect to tub 9.

Referring specifically to FIGURE 1B, a particular adaptation of the hood is illustrated whereby hood 5 may be moved angularly so that as the load or material comes out of the conveyor duct, it is spread uniformly in the respective washing or processing compartments. Similar elements of FIGURE 1A are similarly numbered in FIGURE 1B. In accordance with this adaptation, hood 5 comprises a skirt 44 which permits angular or rocking movement of the hood 5 along the longitudinal axis of tub 9 or rocking or angular movement perpendicular to the longitudinal axis of the tub. As a matter of fact, the angular or rocking movement may be in any direction with respect to the longitudinal axis of the tub. This is secured by having a skirt 44 positioned at the lower edge of hood 12. This skirt may be a flexible impermeable accordian type of metal or other materials or may comprise a flexible plastic skirt such as polyethylene or equivalent flexible plastic or rubber. A preferred structure comprises a lower metallic element 43 or other suitable rigid material by which it is possible to secure an effective seal of the hood and the outer surface of the tub 9. The angular movement may be secured by a motor driven means 50 which actuates bars or struts 51 and 52 to secure the desired angular or rocking movement. A preferred method is to rock the hood through an angle of from about 20 to 40° off the vertical as, for example, about 30° off the vertical. As pointed out heretofore, this will permit the incoming material to pass through tub door 11, cylindrical door 15 and to be uniformly distributed throughout the compartment 10.

FIGURE 2 is a diagrammatical sketch illustrating the single floor plan system and a plurality of precessing units. Elements similar to elements of FIGURE 1 are similarly numbered. FIGURE 2 is a side view of the operation showing vibrating or feed table 1 by which material is introduced into intake hopper 2. The material passes through duct 3 and then separated if desired by means of flexible ducts 4 and 4a controlled by suitable valves (not shown) whereby some of the laundry or other material may be passed into hoods 5 or 5a and thence into processing units 9 or 9a. Air is vented from the respective units by means of vents 18 and 18a by means of blower 9 controlled by motor 20.

FIGURE 3 is, in essence, a top view of the system illustrated in FIGURE 2 except that a plurality of loading tables are employed; namely, tables 1 and 1a, which feed material into hoppers 2 and 2a. Means are provided for rendering the upper ends of said hoppers airtight, such as with slides 2b and 2b'. As pointed out heretofore, the hoods 5 and 5a are readily rocked or angularly moved to secure excellent distribution of the material within each compartment, and are also moved from the opening of one compartment or zone to another along the longitudinal axis of the cylindrical unit. These processing units may contain any number of processing zones or compartments.

Thus, in essence, material such as laundry is fed at one or more receiving stations at a controlled and uniform rate, preferably by means of a vibrating table into an intake hopper or hoppers along with suction or carrying air, causing the laundry or other material to flow in a manner as hereinbefore described. As pointed out that the system is flexible in that a plurality of intake tables or units may be employed and that the conducting ducts may be so controlled as to divert or separate the flowing material into a number of streams of laundry, which streams are directed to a single or to a plurality of processing units. An automatic electrical control system or selector switch may be used so as to cause the material to flow to any desirable point such as washers, tumbler driers, and the like without the necessity of manual control.

The size of the ducts may be varied appreciably depending upon the type and quantity of material to be transferred. Generally, in a conventional laundry processing system, the ducts vary from about 12" to 16" in diameter. The processing units may be of any desired construction; however, it is generally preferred but not necessary that they be of a cylindrical geometric configuration having the longitudinal axis substantially horizontal.

The amount of air sucked through the conduits may also be varied appreciably and will to some extent depend upon the size of the conduits employed. Generally with a 14" diameter conduit, it is preferred to suck from about 5000 to 8000 cu. ft./min. Here again the amount of air sucked will be a function of the material being conveyed and upon other operating variables.

What is claimed is:

1. Improved pneumatic conveying system for bulky materials which comprises in combination (1) means for introducing said materials into the upper end of a collecting hopper, (2) a processing unit adapted to process said materials which is characterized by having a plurality of openings thereinto, (3) a separating hood adapted at one end thereof to form an airtight seal with respect to said openings and adapted to be moved from one opening to another opening, (4) a conveying duct communicating between the other end of said separating hood and the lower end of said hopper, (5) means for causing air flow from said hopper to said separating hood, whereby said bulky materials will be conveyed from said hopper through said conveying duct to said separating hood, wherein conveying air will separate from said materials allowing said materials to fall through said opening to within said processing unit.

2. Pneumatic conveying system as defined by claim 1 wherein said bulky materials comprise laundry and wherein said processing unit comprises a washing machine.

3. Pneumatic conveying system as defined by claim 2 wherein said washing machine comprises an outer cylindrical tub and an inner concentrically mounted perforated rotatably movable cylindrical member, each of which has an opening thereinto.

4. Conveying system as defined by claim 3 wherein said inner cylindrical member is divided into a plurality of washing areas by perforated cross-sectional barriers, each washing area having an opening thereinto, said tub having a plurality of openings corresponding in number to said washing areas, said latter openings being adapted to make an airtight seal with the lower end of said hood.

5. Pneumatic conveying system as defined by claim 1 wherein said hood is moved from opening to opening by overhead supporting means which retracts said hood and laterally moves the hood axially along the unit from one opening to another opening.

6. A pneumatic conveying system as defined by claim 5 wherein said openings not having a separating hood thereover are characterized by having airtight closing doors over them.

7. A conveying system as defined by claim 1 wherein said separating hood is characterized by containing a perforated internal element concentric therewith whereby as conveying air and bulky material pass therethrough, air passes through said perforations and is thereby separated from said bulky material.

8. Pneumatic conveying apparatus as defined by claim 1 wherein said hood contains a lower flexible skirt which is adapted to be rocked in a manner to cause the downfalling bulky material to be evenly distributed within said processing unit.

9. Pneumatic conveying system as defined by claim 1 wherein said means for causing air flow is a power driven fan exhausting air from said processing unit.

10. Improved pneumatic system for conveying bulky materials from receiving stations to processing stations which comprises in combination (1) means for introducing said materials into the upper ends of a plurality of collecting hoppers, (2) means for rendering said upper ends of said hoppers airtight, (3) processing units adapted to process said materials which units are characterized by having a plurality of openings thereinto, (4) separating hoods adapted at one end thereof to form an airtight seal with respect to said openings, said hoods being adapted to be moved from one of said openings to another of said openings, (5) conveying ducts communicating between the other ends of said separating hoods and the lower ends of said hoppers, (6) valve means in said ducts for controlling the flow of air and materials therethrough and, (7) means for causing air flow from said hoppers through said ducts to said separating hoods, whereby said bulky materials will be conveyed from said hoppers through said conveying ducts to said separating hoods, wherein conveying air will separate from said materials allowing said materials to fall through said openings to within said processing units.

11. System as defined by claim 10 wherein said materials comprise laundry and wherein said processing units comprise washing machines.

12. System as defined by claim 11 wherein said washing machines are characterized by being substantially cylindrical tubs having concentrically mounted rotatable inner perforated cylinders, said tubs being characterized by containing a plurality of openings in each tub, said inner perforated cylinders being characterized by containing a number of washing areas and having openings corresponding to the openings in said tubs and means for moving the hood of each tub to each opening on said tub.

References Cited by the Examiner
UNITED STATES PATENTS 2,556,058  6/51  Boon ------------------ 302—17
2,572,862  10/51  Israel ----------------- 302—28

SAMUEL F. COLEMAN, *Primary Examiner.*

ANDRES H. NIELSEN, *Examiner.*